(12) United States Patent
Sun et al.

(10) Patent No.: US 12,118,213 B2
(45) Date of Patent: Oct. 15, 2024

(54) METHOD AND SYSTEM FOR BALANCING AND OPTIMIZING PRIMARY PLACEMENT GROUP, AND DEVICE AND MEDIUM

(71) Applicant: SUZHOU INSPUR INTELLIGENT TECHNOLOGY CO., LTD., Jiangsu (CN)

(72) Inventors: Runyu Sun, Jiangsu (CN); Xiangrui Meng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 8 days.

(21) Appl. No.: 17/927,465

(22) PCT Filed: Jan. 26, 2021

(86) PCT No.: PCT/CN2021/073795
§ 371 (c)(1),
(2) Date: Nov. 23, 2022

(87) PCT Pub. No.: WO2021/238285
PCT Pub. Date: Dec. 2, 2021

(65) Prior Publication Data
US 2023/0205421 A1    Jun. 29, 2023

(30) Foreign Application Priority Data

May 24, 2020   (CN) .......................... 202010445414.0

(51) Int. Cl.
G06F 3/06    (2006.01)
(52) U.S. Cl.
CPC ............ *G06F 3/061* (2013.01); *G06F 3/0644* (2013.01); *G06F 3/067* (2013.01)
(58) Field of Classification Search
CPC ......... G06F 3/061; G06F 3/0644; G06F 3/067
See application file for complete search history.

(56) References Cited

U.S. PATENT DOCUMENTS 8,458,299 B2   6/2013  Lin et al.
8,874,494 B1 * 10/2014  Evans ................... G06F 11/008
                                                            714/6.32
(Continued)

FOREIGN PATENT DOCUMENTS

CN         106649702 A     5/2017
CN         109196459 A     1/2019
(Continued)

OTHER PUBLICATIONS

Search report for Chinese application No. 202010445414.0 filed on May 24, 2020.

(Continued)

*Primary Examiner* — Ryan Bertram
(74) *Attorney, Agent, or Firm* — Dennemeyer & Associates LLC; Victoria Friedman

(57) ABSTRACT

Provided are a method and system for balancing and optimizing a primary placement group, and a device and a storage medium. The method includes: determining a theoretical average value; determining a weight corresponding to each object-based storage device based on an actual capacity occupied by the object-based storage device and the theoretical average value; determining the number of expected balanced primary placement groups based on the total number of current primary placement groups and the weight corresponding to the object-based storage device; obtaining a corresponding base value based on an address of each placement group and an address of the object-based storage device, and determining the placement group as a primary placement group in a case where the base value is less than a preset value; and repeating a previous operation until the number of the determined primary placement groups reaches the number of the expected balanced primary placement groups.

18 Claims, 3 Drawing Sheets

(56) References Cited

U.S. PATENT DOCUMENTS

| | | | | |
|---|---|---|---|---|
| 2016/0349993 | A1* | 12/2016 | Udupi | G06F 3/067 |
| 2021/0004172 | A1* | 1/2021 | Shimmitsu | G06F 3/0649 |
| 2021/0365192 | A1* | 11/2021 | Zhen | G06F 3/0689 |
| 2023/0136274 | A1* | 5/2023 | Bruno | H04L 49/205 |
| | | | | 711/154 |
| 2023/0195323 | A1* | 6/2023 | Wang | G06F 3/0644 |
| | | | | 711/101 |
| 2023/0205421 | A1* | 6/2023 | Sun | G06F 3/0644 |
| | | | | 711/154 |
| 2023/0409207 | A1* | 12/2023 | Nakamura | G06F 3/067 |

FOREIGN PATENT DOCUMENTS

| | | | |
|---|---|---|---|
| CN | 109343798 A | | 2/2019 |
| CN | 109992216 A | | 7/2019 |
| CN | 111708486 A | | 9/2020 |
| CN | 109992216 B | * | 1/2023 |

OTHER PUBLICATIONS

Search report for International application No. PCT/CN2021/073795 mailed on Apr. 29, 2021.

* cited by examiner

METHOD AND SYSTEM FOR BALANCING AND OPTIMIZING PRIMARY PLACEMENT GROUP, AND DEVICE AND MEDIUM

CROSS-REFERENCE TO RELATED APPLICATION

This application is a National Stage Filing of PCT International Application No. PCT/CN2021/073795 filed on Jan. 26, 2021, which is based upon and claims priority to Chinese Patent Application No. 202010445414.0, filed to the China National Intellectual Property Administration on May 24, 2020 and entitled "Method and System for Balancing and Optimizing Primary Placement Group, and Device and Medium", the disclosure of which is hereby incorporated by reference in its entirety.

TECHNICAL FIELD

The present disclosure relates to the field of distributed storage, and more specifically, to a method and system for balancing and optimizing a primary placement group, and a computer device and a computer-readable storage medium.

BACKGROUND

In a distributed storage system, stored content is cut according to a fixed size. This piece of data with the fixed size is called an object. A Placement Group (PG) is aggregation of a plurality of objects, and a storage pool is aggregation of a plurality of PGs. The PG and the storage pool are both logical concepts. Each PG corresponds to one or more Object-based Storage Devices (OSDs) based on a data distribution algorithm. One PG may correspond to a plurality of OSDs. The OSD may be simply understood as a physical disk. One OSD may store thereon a plurality of PGs. In this way, the content to be stored is placed on the disk. In order to guarantee consistency of data, a redundancy policy and division of PG roles are introduced. One PG that plays a leading role is selected as a start of data reading and writing, and this PG is referred to as a primary placement group (primary PG). Other PGs for redundant storage are referred to as replica placement groups (replica PGs). Such a group of PGs including the primary PG and the replica PGs is collectively referred to as a redundant group. Data stored in respective PGs in one redundant group are consistent. For a certain redundant group, if a write operation is to be performed in the redundant group, data is written in the primary PG first and then delivered to the replica PGs in the redundant group; and if a read operation is to be performed in the redundant group, the read operation will be directed to and executed on the primary PG. The identifier (ID, which is namely the address) of the PG and the ID (which is namely the address) of the OSD are uniquely determined values after a distributed cluster storage pool is created.

It can be concluded from the above that, in the distributed storage cluster, if the distribution of the primary PGs in respective redundant groups on the OSDs is unbalanced, then the pressure on different OSDs would also be different, which affects the performance of the cluster. In the distributed cluster, a solid state disk may often be used as a cache disk of a plurality of mechanical hard disks. The numbers of the cache disks, used by the mechanical disks, on respective solid state disks are different. In the related art, the primary placement group is adjusted according to the weight of the mechanical disk, and the impact of the cache disk is not considered, which causes a certain waste of cluster performance.

SUMMARY

In view of the above, embodiments of the present disclosure provide a method and system for balancing and optimizing a primary placement group, and a computer device and a computer-readable storage medium. By means of calculating a weight of each OSD, calculating the number of expected balanced primary PGs based on the weight of the OSD, obtaining a corresponding base value based on an address of each PG and an address of the OSD, and comparing the base value with a preset value so as to determine whether the PG is a primary PG, the performance of a system may be optimized.

An aspect of the embodiments of the present disclosure provides a method for balancing and optimizing a primary placement group. The method includes: determining a theoretical average value according to a total capacity of one or more cache disks and a total number of object-based storage devices; determining a weight corresponding to each object-based storage device in the object-based storage devices based on an actual capacity occupied by the object-based storage device and the theoretical average value; obtaining a total number of current primary placement groups, and determining the number of expected balanced primary placement groups based on the total number of the current primary placement groups and the weight corresponding to the object-based storage device; reading an address of each placement group in a redundant group, obtaining a corresponding base value based on the address of the placement group and an address of the object-based storage device, and determining the placement group as a primary placement group in a case where the base value is less than a preset value; and repeating a previous operation until the number of the determined primary placement groups reaches the number of the expected balanced primary placement groups.

In some implementations, the operation of determining the weight corresponding to each object-based storage device in the object-based storage devices based on the actual capacity occupied by the object-based storage device and the theoretical average value includes: determining the actual capacity occupied by each object-based storage device based on a capacity of a single cache disk and the number of caches corresponding to the single cache disk.

In some implementations, the operation of determining the number of expected balanced primary placement groups based on the total number of the current primary placement groups and the weight corresponding to the object-based storage device includes: dividing the total number of the current primary placement groups by the total number of the object-based storage devices to determine an average; and multiplying the average by the weight corresponding to the object-based storage device to obtain the number of the expected balanced primary placement groups.

In some implementations, the operation of obtaining the corresponding base value based on the address of the placement group and the address of the object-based storage device includes: calculating a first value from the address of the placement group and the address of the object-based storage device by using a Hash algorithm, and obtaining highest sixteen bits of the first value by applying a right shift operator on the first value.

Another aspect of the embodiments of the present disclosure provides a system for balancing and optimizing a primary placement group. The system includes: a first calculation module, configured to determine a theoretical average value according to a total capacity of one or more cache disks and a total number of object-based storage devices; a second calculation module, configured to determine a weight corresponding to each object-based storage device in the object-based storage devices based on an actual capacity occupied by the object-based storage device and the theoretical average value; a third calculation module, configured to obtain a total number of current primary placement groups, and determine the number of expected balanced primary placement groups based on the total number of the current primary placement groups and the weight corresponding to the object-based storage device; a first execution module, configured to read an address of each placement group in a redundant group, obtain a corresponding base value based on the address of the placement group and an address of the object-based storage device, and determine the placement group as a primary placement group in a case where the base value is less than a preset value; and a second execution module, configured to repeat a previous operation until the number of the determined primary placement groups reaches the number of the expected balanced primary placement groups.

In some implementations, the second calculation module is further configured to: determine the actual capacity occupied by each object-based storage device based on a capacity of a single cache disk and the number of caches corresponding to the single cache disk.

In some implementations, the third calculation module is further configured to: divide the total number of the current primary placement groups by the total number of the object-based storage devices to determine an average; and multiply the average by the weight corresponding to the object-based storage device to obtain the number of the expected balanced primary placement groups.

In some implementations, the first execution module is further configured to: calculate a first value from the address of the placement group and the address of the object-based storage device by using a Hash algorithm, and obtain highest sixteen bits of the first value by applying a right shift operator on the first value.

Still another aspect of the embodiments of the present disclosure provides a computer device, including: at least one processor and a memory storing a computer instruction executable on the at least one processor. The computer instruction implements operations of the above method when being executed by the at least one processor.

Yet another aspect of the embodiments of the present disclosure provides a computer-readable storage medium. The computer-readable storage medium stores a computer program that implements operations of the above method when being executed by at least one processor.

The technical solution of the present disclosure has the following beneficial technical effects. By means of calculating a weight of each OSD, calculating the number of expected balanced primary PGs based on the weight of the OSD, obtaining a corresponding base value based on an address of each PG and an address of the OSD, and comparing the base value with a preset value so as to determine whether the PG is a primary PG, the performance of a system may be optimized.

BRIEF DESCRIPTION OF THE DRAWINGS

In order to illustrate the technical solutions in the embodiments of the present disclosure or technical solutions in the related art more clearly, the drawings used in the technical description of the embodiments will be briefly described below. It is apparent that the drawings in the following descriptions are merely for illustrating some embodiments of the present disclosure. Other embodiments can be obtained from those having ordinary skill in the art according to these drawings without any creative work.

DETAILED DESCRIPTION OF THE EMBODIMENTS

To make the objectives, technical solutions and advantages of the present disclosure clearer, the present disclosure is further described in detail with reference to exemplary embodiments and drawings.

It is to be noted that, all expressions using "first" and "second" in the embodiments of the present disclosure are for the purpose of distinguishing two non-identical entities or non-identical parameters with the same name. It can be concluded that "first" and "second" are only for the convenience of expression, and should not be construed as a limitation to the embodiments of the present disclosure. Such understanding applies for all embodiments and will not be repeated in the subsequent embodiments.

Figure 1:
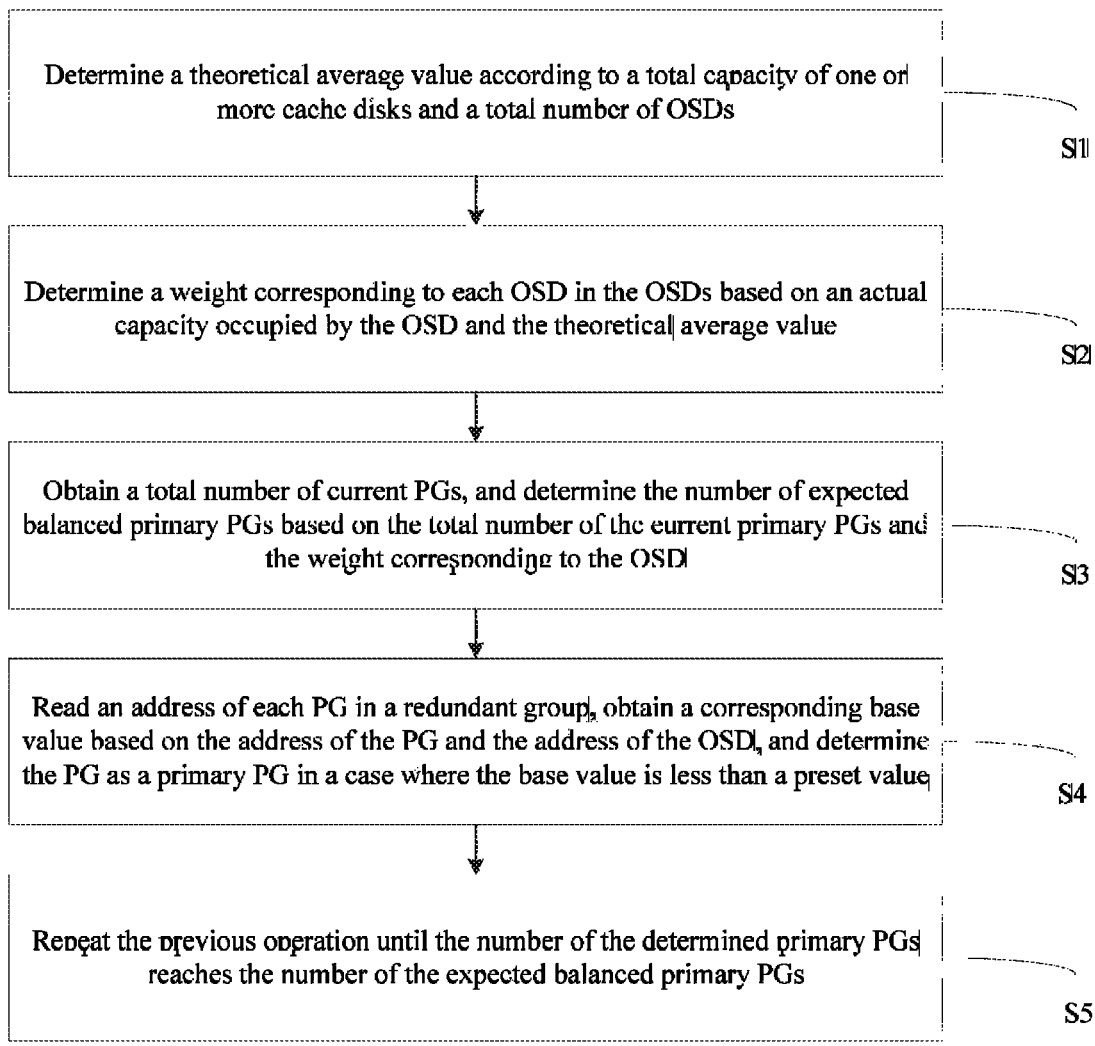
FIG. 1 is a schematic diagram of a method for balancing and optimizing a primary placement group according to an embodiment of the present disclosure.

A first aspect of the embodiments of the present disclosure provides an embodiment of a method for balancing and optimizing a primary placement group. FIG. 1 is a schematic diagram of a method for balancing and optimizing a primary placement group according to an embodiment of the present disclosure. As shown in FIG. 1, the embodiment of the present disclosure includes the following operations.

At S1, a theoretical average value is determined according to a total capacity of one or more cache disks and a total number of OSDs.

At S2, a weight corresponding to each OSD in the OSDs is determined based on an actual capacity occupied by the OSD and the theoretical average value.

At S3, a total number of current primary PGs is obtained, and the number of expected balanced primary PGs is determined based on the total number of the current primary PGs and the weight corresponding to the OSD.

At S4, an address of each PG in a redundant group is read, a corresponding base value is obtained based on the address of the PG and an address of the OSD, and the PG is determined as a primary PG in a case where the base value is less than a preset value.

At S5, the previous operation is repeated until the number of the determined primary PGs reaches the number of the expected balanced primary PGs.

The theoretical average value is determined according to the total capacity of the cache disks and the total number of the OSDs. Firstly, the total capacity M of all cache disks is calculated; the total number of the OSDs is N; and an average value can be determined by dividing the total capacity M by the number N of mechanical disks with caches, that is, the theoretical average value avg of the cache capacity occupied by each mechanical disk with caches. For example, assuming that there are 5 cache disks in a distributed cluster, the total capacity M=7.5 T, there are a total of 15 mechanical disks, and each mechanical disk corresponds to one cache, that is, N=15, n=15/5=3, that is, each cache disk corresponds to 3 caches. Assuming that the capacity of a certain mechanical disk is 1.5 T, the capacity of the cache disk occupied by this mechanical disk is: 1.5 T/3=0.5 T, and the theoretical average value avg=M/N=7.5 T/15=0.5 T.

The weight corresponding to each OSD is determined based on an actual capacity occupied by the OSD and the theoretical average value. In some implementations, the operation of determining the weight corresponding to the OSD based on the actual capacity occupied by the OSD and the theoretical average value includes: determining the actual capacity occupied by each OSD based on a capacity of a single cache disk and the number of caches corresponding to the single cache disk. In the above example, a single cache disk corresponds to 3 caches, and the capacity of the single cache disk is 1.5 T, then the actual capacity occupied by each OSD is 1.5 T/3=0.5 T, and the weight corresponding to the OSD is determined to be 0.5 T/0.5 T=1 based on the actual capacity 0.5 T occupied by the OSD and the theoretical average value 0.5 T.

The total number of current primary PGs is obtained, and the number of expected balanced primary PGs is determined based on the total number of the current primary PGs and the weight corresponding to the OSD. In some implementations, the operation of determining the number of the expected balanced primary PGs based on the total number of the current primary PGs and the weight corresponding to the OSD includes: dividing the total number of the current primary PGs by the total number of the OSDs to determine an average; and multiplying the average by the weight corresponding to the OSD to obtain the number of the expected balanced primary PGs. For example, assuming that there are a total of 512 primary PGs, an average of the primary PGs is: 512/15=34, and the number of the expected balanced primary PGs is 34*1. In order to reduce errors, the number of the expected balanced primary PGs may be set to 34± a preset allowable error number.

The address of each PG in the redundant group is read, the corresponding base value is obtained based on the address of the PG and the address of the OSD, and the PG is determined as the primary PG in a case where the base value is less than the preset value. In some implementations, the operation of obtaining the corresponding base value based on the address of the PG and the address of the OSD includes: calculating a first value from the address of the PG and the address of the OSD by using a Hash algorithm, and obtaining highest sixteen bits of the first value by applying a right shift operator on the first value. A predetermined value is set by statistical testing through a trial and error method, and generally ranges from 0.5 to 1, excluding 1. The recommended value of the predetermined value is 0.6, 0.7 or 0.8. A definite value is obtained by inputting the ID of the PG and the ID of the OSD into the Hash algorithm. The obtained definite value is actually a 32-bit binary number, and the highest 16 bits of the definite value are obtained by means of the operation of a right shift operator. The preset value may be obtained by multiplying the predetermined value by 65536. Whether the PG is used as the primary PG is determined by comparing the base value with the preset value. When the base value is less than the preset value, the current PG and the OSD corresponding to the PG are selected as primary. The larger the predetermined value, the larger the possibility that the base value is less than the preset value, and the larger the probability that the current PG is selected as primary, so as to achieve a certain degree of randomness. The primary PG may be randomly selected to a certain extent by adjusting the predetermined value.

The previous operation is repeated until the number of the determined primary PGs reaches the number of the expected balanced primary PGs.

It is to be noted that, respective operations in each embodiment of the above method for balancing and optimizing the primary placement group may be swapped, replaced, added, or deleted, so that these rational permutation and/or combination transformations for the method for balancing and optimizing a primary placement group should also belong to the protection scope of the present disclosure, and the protection scope of the present disclosure should not be limited to the embodiments.

Figure 2:
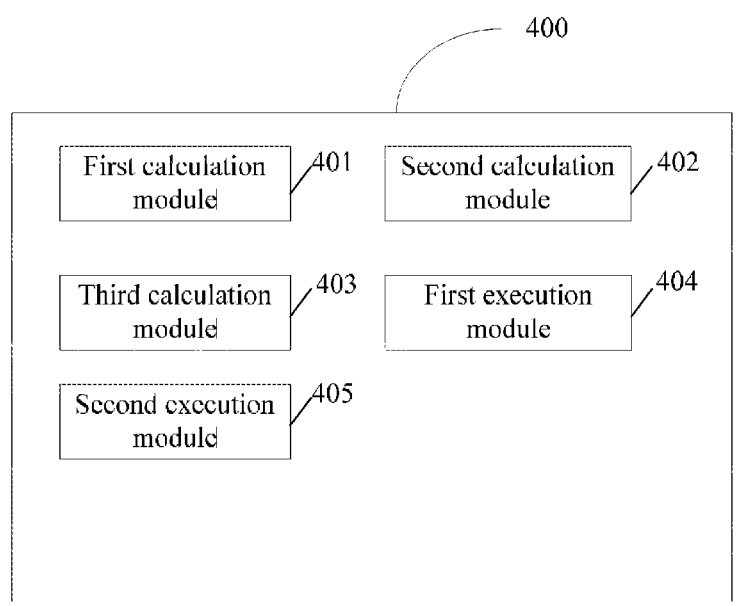
FIG. 2 is a schematic structural diagram of a system for balancing and optimizing a primary placement group according to an embodiment of the present disclosure.

As shown in FIG. 2, a second aspect of the embodiments of the present disclosure provides a system 400 for balancing and optimizing a primary placement group. The system includes: a first calculation module 401, configured to determine a theoretical average value according to a total capacity of one or more cache disks and a total number of OSDs; a second calculation module 402, configured to determine a weight corresponding to each OSD in the OSDs based on an actual capacity occupied by the OSD and the theoretical average value; a third calculation module 403, configured to obtain a total number of current primary PGs, and determine the number of expected balanced primary PGs based on the total number of the current primary PGs and the weight corresponding to the OSD; a first execution module 404, configured to read an address of each PG in a redundant group, obtain a corresponding base value based on the address of the PG and an address of the OSD, and determine the PG as a primary PG in a case where the base value is less than a preset value; and a second execution module 405, configured to repeat the previous operation until the number of the determined primary PGs reaches the number of the expected balanced primary PGs.

In some implementations, the second calculation module 402 is further configured to determine the actual capacity occupied by each OSD based on a capacity of a single cache disk and the number of caches corresponding to the single cache disk.

In some implementations, the third calculation module 403 is further configured to: divide the total number of the current primary PGs by the total number of the OSDs to determine an average; and multiply the average by the weight corresponding to the OSD to obtain the number of the expected balanced primary PGs.

In some implementations, the first execution module 404 is further configured to: calculate a first value from the address of the PG and the address of the OSD by using a Hash algorithm, and obtain highest sixteen bits of the first value by applying a right shift operator on the first value.

A third aspect of the embodiments of the present disclosure provides a computer device, including: at least one processor and a memory storing a computer instruction executable on the at least one processor. The computer instruction is executed by the at least one processor to implement the following operations. At S1, a theoretical average value is determined according to a total capacity of one or more cache disks and a total number of OSDs. At S2, a weight corresponding to each OSD in the OSDs is determined based on an actual capacity occupied by the OSD and the theoretical average value. At S3, a total number of current primary PGs is obtained, and the number of expected balanced primary PGs is determined based on the total number of the current primary PGs and the weight corresponding to the OSD. At S4, an address of each PG in a redundant group is read, a corresponding base value is obtained based on the address of the PG and an address of the OSD, and the PG is determined as a primary PG in a case where the base value is less than a preset value. At S5, the previous operation is repeated until the number of the determined primary PGs reaches the number of the expected balanced primary PGs.

In some implementations, the operation of determining the weight corresponding to the OSD based on the actual capacity occupied by the OSD and the theoretical average value includes: determining the actual capacity occupied by each OSD based on a capacity of a single cache disk and the number of caches corresponding to the single cache disk.

In some implementations, the operation of determining the number of the expected balanced primary PGs based on the total number of the current primary PGs and the weight corresponding to the OSD includes: dividing the total number of the current primary PGs by the total number of the OSDs to determine an average; and multiplying the average by the weight corresponding to the OSD to obtain the number of the expected balanced primary PGs.

In some implementations, the operation of obtaining the corresponding base value based on the address of the PG and the address of the OSD includes: calculating a first value from the address of the PG and the address of the OSD by using a Hash algorithm, and obtaining highest sixteen bits of the first value by applying a right shift operator on the first value.

Figure 3:
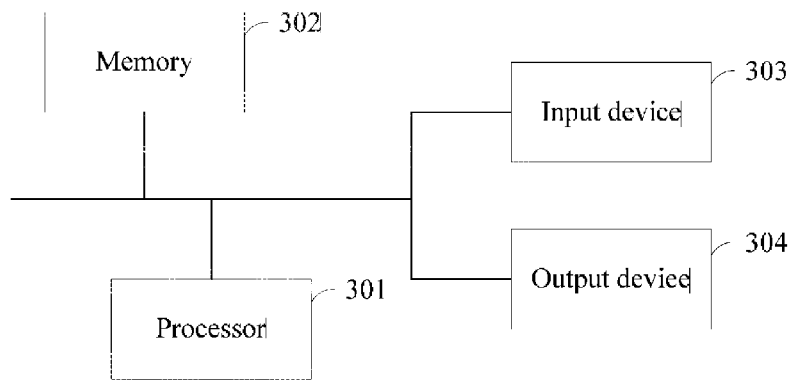
FIG. 3 is a schematic diagram of a hardware structure of a computer device for balancing and optimizing a primary placement group according to an embodiment of the present disclosure.

FIG. 3 is a schematic diagram of a hardware structure of a computer device for balancing and optimizing a primary placement group according to an embodiment of the present disclosure.

Taking the apparatus shown in FIG. 3 as an example, the apparatus includes a processor 301 and a memory 302, and may further include an input device 303 and an output device 304.

The processor 301, the memory 302, the input device 303 and the output device 304 may be connected by a bus or in other manners. In FIG. 3, connection by the bus is used as an example.

The memory 302 is a non-volatile computer readable storage medium. The memory may be configured to store a non-volatile software program, a non-volatile computer-executable program and a module, for example, program instructions/modules corresponding to the method for balancing and optimizing a primary placement group in the embodiments of this application. The processor 301 executes various functional applications and data processing of a server by running the non-volatile software programs, the instructions and the modules stored in the memory 302. That is to say, the processor implements the method for balancing and optimizing a primary placement group in the above method embodiments.

The memory 302 may include a program storage area region and a data storage area. The program storage area may store an operating system and an application program required for at least one function. The data storage area may store data created according to use of the method for balancing and optimizing a primary placement group. In addition, the memory 302 may include a high-speed random access memory, and may further include a non-volatile memory, for example, at least one disk memory devices, a flash memory device, or other non-volatile solid state memory devices. In some embodiments, the memory 302 may optionally include memories remotely disposed relative to the processor 301. These remote memories may be connected to a local module by a network. Examples of the above network include, but are not limited to, the Internet, an intranet, a local area network, a mobile communication network, and a combination thereof.

The input device 303 may receive input information such as user names and passwords. The output device 304 may include other display devices such as a display screen.

One or more program instructions/modules corresponding to the method for balancing and optimizing a primary placement group are stored in the memory 302, and when being executed by the at least one processor 301, execute the method for balancing and optimizing a primary placement group in any of the above method embodiments.

Any one of the embodiments of the computer device for executing the method for balancing and optimizing a primary placement group may achieve the same or similar effects as any of the foregoing corresponding method embodiments.

Figure 4:
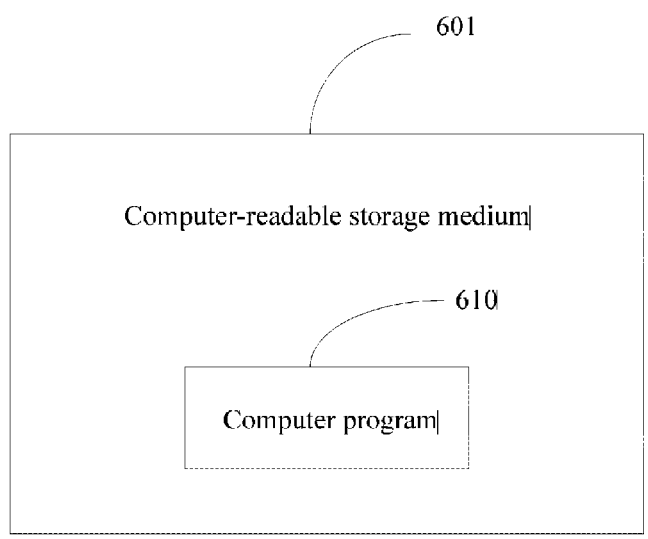
FIG. 4 is a schematic structural diagram of a computer-readable storage medium according to an embodiment of the present disclosure.

The embodiments of the present disclosure provide a computer-readable storage medium 601. As shown in FIG. 4, the computer-readable storage medium 601 stores a computer program 610 that implements the above method when being executed by the at least one processor.

It is to be noted that, those having ordinary skill in the art may understand that all or part of the processes in the above method embodiments may be implemented by a computer program to instruct related hardware, and the program of the method for balancing and optimizing a primary placement group may be stored in a computer-readable storage medium. When the program is executed, the flow of each method embodiment as described above may be included. The storage medium of the program may be a magnetic disk, an optical disk, a Read Only Memory (ROM) or a Random Access Memory (RAM), and the like. The embodiments of the computer program may achieve the same or similar effects as the corresponding any of the foregoing method embodiments.

In addition, the methods disclosed according to the embodiments of the present disclosure may also be implemented as a computer program executed by at least one processor, and the computer program may be stored in a computer-readable storage medium. When the computer program is executed by the processor, the above functions defined in the methods disclosed in the embodiments of the present disclosure are executed.

In addition, the above method operations and system units may also be implemented by a controller and a computer-readable storage medium for storing a computer program that enables the controller to implement the functions of the above operations or units.

In addition, it is to be understood that, the computer-readable storage medium (for example, a memory) herein may be a volatile memory or a non-volatile memory, or may include both volatile memory and non-volatile memory. By way of example and not limitation, the non-volatile memory may include an ROM, a Programmable ROM (PROM), an Electrically Programmable ROM (EPROM), an Electrically Erasable and Programmable ROM (EEPROM), or a flash memory. The volatile memory may include an RAM, and the RAM may serve as an external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ES- DRAM), Synchronous Link DRAM (SLDRAM), and Direct Rambus RAM (DRRAM). The storage device of the disclosed aspects is intended to include, but not limited to, these and other suitable types of memories.

Those having ordinary skill in the art will also appreciate that, the various exemplary logical blocks, modules, circuits, and algorithm operations described in combination with the disclosure may be implemented as electronic hardware, computer software, or a combination of the electronic hardware and the computer software. To clearly describe such interchangeability of hardware and software, various illustrative components, blocks, modules, circuits, and operations have been described generally in terms of their functionality. Whether such functionality is implemented as software or hardware depends on the specific application and design constraints imposed on the entire system. Those having ordinary skill in the art may implement the functions in various ways for each specific application, but such implementation decisions should not be interpreted as causing a departure from the scope of the disclosed embodiments of the present disclosure.

The various exemplary logical blocks, modules, and circuits described in combination with the disclosure can be implemented or executed by using the following components designed to perform the functions herein: a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination of these components. The general purpose processor may be a microprocessor, but in the alternative, the processor may be any conventional processor, controller, microcontroller, or state machine. The processor may also be implemented as a combination of computing devices, for example, a combination of a DSP and a microprocessor, a plurality of microprocessors, one or more microprocessors in combination with a DSP, and/or any other such configuration.

The operations of the method or algorithm described in combination with the disclosure may be included directly in hardware, in a software module executed by at least one processor, or in a combination of the hardware and the software module. The software module may reside in an RAM memory, a flash memory, an ROM memory, an EPROM memory, an EEPROM memory, a register, a hard disk, a removable disk, a CD-ROM, or any other form of storage medium known in the art. An example storage medium is coupled to a processor, such that the processor can read information from, and write information to, the storage medium. In an alternative solution, the storage medium may be integrated with the processor. The processor and the storage medium may reside in an ASIC. The ASIC may reside in a user terminal. In an alternative solution, the processor and the storage medium may reside in the user terminal as discrete components.

In one or more exemplary designs, functions may be implemented in hardware, software, firmware, or any combination thereof. If the functions are implemented in the software, the functions may be stored on the computer-readable storage medium as one or more instructions or codes or be transferred by means of the computer-readable storage medium. The computer-readable storage medium includes a computer storage medium and a communication medium. The communication medium includes any media transmitting a computer program from one place to another place. The storage medium may be any available media that can be accessed by a general or special computer. By way of example and not limitation, the computer-readable storage medium may include RAM, ROM, EEPROM, CD-ROM or other optical disk storage devices, magnetic disk storage devices or other magnetic storage devices, or may be used to carry or store the required program code in the form of instructions or data structures, and any other medium that can be accessed by a general or special computer or a general or special processor. In addition, any connection is properly called a computer-readable storage medium. For example, if a coaxial cable, a fiber optic cable, a twisted pair, a Digital Subscriber Line (DSL), or wireless technologies such as infrared, radio and microwave are used to send software from a website, a server, or other remote sources, the above coaxial cable, the fiber optic cable, the twisted pair, the DSL or the wireless technologies such as infrared, radio and microwave are all included in the definition of the medium. As used herein, the magnetic disk and the optical disk include Compact Disks (CDs), laser disks, optical disks, Digital Versatile Disks (DVDs), floppy disks, blu-ray disks, and the disks usually reproduce data magnetically, while the optical disks reproduce data optically with lasers. Combinations of the above should also be included within the scope of the computer-readable storage medium.

The above are exemplary embodiments of the present disclosure, but it should be noted that, various changes and modifications may be made without departing from the scope disclosed in the embodiments of the present disclosure as defined in the claims. The functions, operations and/or actions of the method claims in accordance with the disclosed embodiments described herein need not be performed in any particular order. In addition, although elements disclosed in the embodiments of the present disclosure may be described or claimed in the singular form, unless explicitly limited to the singular form, the plural form may also be included.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those of ordinary skill in the art may understand that, all or part of the operations in the above embodiments may be completed by means of hardware, or may be completed by instructing the related hardware through a program. The program may be stored in a computer-readable storage medium, and the foregoing storage medium may be an ROM, a magnetic disk, or an optical disk.

Those of ordinary skill in the art should understand that, the discussion of any of the above embodiments is merely exemplary, and is not intended to imply that the scope (defined by the claims) disclosed in the embodiments of the present disclosure is limited to these examples. Under the idea of the embodiments of the present disclosure, the technical features in the above embodiments or different embodiments can also be combined. In addition, there are many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for balancing and optimizing a primary placement group, applied to a computer device, the computer device comprising at least one processor and a memory, the memory being used to store computer instructions that are executable on the processor, the computer instructions, when executed by the processor, implementing the method, the method comprising:
   determining a theoretical average value according to a total capacity of one or more cache disks and a total number of object-based storage devices, wherein capacity is M, the total number is N, the object-based storage devices comprise N object-based storage devices which are all mechanical disks, and the theoretical average value is used to indicate cache capacity occupied by each mechanical disk with caches, N is an integer greater than 1, M is greater than 0;
   determining a weight corresponding to a current object-based storage device of the N object-based storage devices based on an actual capacity occupied by the current object-based storage device and the theoretical average value;
   obtaining a total number of current primary placement groups, and determining the number of expected balanced primary placement groups based on the total number of the current primary placement groups and the weight corresponding to the current object-based storage device;
   reading an address of a current placement group placed in the current object-based storage device, obtaining a corresponding base value based on the address of the current placement group and an address of the current object-based storage device, and determining the current placement group placed in the current object-based storage device as a primary placement group in a case where the base value is less than a preset value; and
   repeating a previous operation until the number of the determined primary placement groups in the current object-based storage device reaches the number of the expected balanced primary placement groups;
   wherein the obtaining a corresponding base value based on the address of the current placement group and an address of the current of object-based storage device comprises,
   calculating a first value from the address of the current placement group and the address of the current object-based storage device by using a Hash algorithm, and obtaining highest sixteen bits of the first value as the corresponding base value.

2. The method according to claim 1, wherein before determining a weight corresponding to a current object-based storage device of the N object-based storage devices based on an actual capacity occupied by the current object-based storage device and the theoretical average value, the method comprises:
   determining the actual capacity occupied by the current object-based storage device based on a capacity of a single cache disk and the number of caches corresponding to the single cache disk.

3. The method according to claim 1, wherein the determining the number of expected balanced primary placement groups based on the total number of the current primary placement groups and the weight corresponding to the current object-based storage device comprises:
   dividing the total number of the current primary placement groups by the total number of the object-based storage devices to determine an average; and
   multiplying the average by the weight corresponding to the current object-based storage device to obtain the number of the expected balanced primary placement groups.

4. A computer device, comprising:
   at least one processor; and
   a memory storing a computer instruction executable on the at least one processor, wherein the computer instruction, when being executed by the at least one processor, implements operations of the method according to claim 1.

5. A non-transitory computer-readable storage medium, storing a computer program, wherein when the computer program is executed by at least one processor, operations of the method according to claim 1 are implemented.

6. The method according to claim 1, wherein the determining the number of expected balanced primary placement groups based on the total number of the current primary placement groups and the weight corresponding to the current object-based storage device comprises:
   dividing the total number of the current primary placement groups by the total number of the object-based storage devices to determine an average; and
   multiplying the average by the weight corresponding to the current object-based storage device to obtain a multiplying result, and determining the number of the expected balanced primary placement groups as any value within a range defined by (the multiplying result–a preset allowable error number) and (the multiplying result+the preset allowable error number).

7. The method according to claim 1, wherein the determining a weight corresponding to a current object-based storage device of the N object-based storage devices based on an actual capacity occupied by the current object-based storage device and the theoretical average value comprises:
   determining the weight corresponding to the current object-based storage device of the N object-based storage devices by dividing the actual capacity occupied by the current object-based storage device by the theoretical average value.

8. The method according to claim 1, wherein the obtaining highest sixteen bits of the first value comprises:
   obtaining the highest sixteen bits of the first value by applying a right shift operator on the first value.

9. The method according to claim 1, wherein the preset value is obtained by multiplying a predetermined value by 65536.

10. The method according to claim 9, wherein the primary placement group is randomly determined by adjusting the predetermined value.

11. The computer device according to claim 4, wherein the processor, when being configured to execute the instructions to determine the number of expected balanced primary placement groups based on the total number of the current primary placement groups and the weight corresponding to the current object-based storage device, is configured to execute the instructions to:
   divide the total number of the current primary placement groups by the total number of the object-based storage devices to determine an average; and
   multiply the average by the weight corresponding to the current object-based storage device to obtain a multiplying result, and determine the number of the expected balanced primary placement groups as any value within a range defined by (the multiplying result–a preset allowable error number) and (the multiplying result+the preset allowable error number).

12. The computer device according to claim 4, wherein the processor, when being configured to execute the instructions to determine the weight corresponding to the current object-based storage device of the N object-based storage devices based on the actual capacity occupied by the current object-based storage device and the theoretical average value, is configured to execute the instructions to:
- determine the weight corresponding to the current object-based storage device of the N object-based storage devices by dividing the actual capacity occupied by the current object-based storage device by the theoretical average value.

13. The computer device according to claim 4, wherein the processor, when being configured to execute the instructions to obtain the highest sixteen bits of the first value, is configured to execute the instructions to:
- obtain the highest sixteen bits of the first value by applying a right shift operator on the first value.

14. The computer device according to claim 4, wherein the preset value is obtained by multiplying a predetermined value by 65536.

15. The computer device according to claim 14, wherein the primary placement group is randomly determined by adjusting the predetermined value.

16. A computer device, comprising:
- at least one processor; and
- a memory storing a computer instruction executable on the at least one processor, wherein the computer instruction, when being executed by the at least one processor, implements operations of the method according to claim 2.

17. A computer device, comprising:
- at least one processor; and
- a memory storing a computer instruction executable on the at least one processor, wherein the computer instruction, when being executed by the at least one processor, implements operations of the method according to claim 3.

18. A computer device, comprising:
- at least one processor; and
- a memory storing a computer instruction executable on the at least one processor, wherein the computer instruction, when being executed by the at least one processor, implements operations of the method according to claim 9.

* * * * *